United States Patent [19]
Mai et al.

[11] 3,893,950
[45] July 8, 1975

[54] METHOD FOR PREPARING A CATALYST FOR THE OXIDATIVE PURIFICATION OF EXHAUST GASES

[75] Inventors: Gerhard Mai, Bruchkobel; Reiner Siepmann, Niederrodenbach, both of Germany

[73] Assignee: W. C. Heraeus GmbH, Hanau am Main, Germany

[22] Filed: Nov. 23, 1973

[21] Appl. No.: 418,789

Related U.S. Application Data
[63] Continuation-in-part of Ser. No. 330,137, Feb. 6, 1973, abandoned.

[30] Foreign Application Priority Data
Aug. 3, 1973 Germany............................ 2339338

[52] U.S. Cl.......... 252/466 PT; 252/463; 423/213.5
[51] Int. Cl................................................ B01j 11/08
[58] Field of Search............ 252/466 PT; 423/213.2, 423/213.5

[56] References Cited
UNITED STATES PATENTS

| | | | |
|---|---|---|---|
| 2,742,437 | 4/1956 | Houdry............................ | 252/469 X |
| 3,271,324 | 9/1966 | Stephens et al................. | 252/466 B |
| 3,331,787 | 7/1967 | Keith et al...................... | 252/466 A |
| 3,540,838 | 11/1970 | Reitmeier et al................ | 423/213.5 |
| 3,554,929 | 1/1971 | Aarons........................... | 252/477 R |
| 3,741,725 | 6/1973 | Graham.......................... | 423/213.5 |
| 3,785,998 | 1/1974 | Hoekstra......................... | 252/477 R |

*Primary Examiner*—Winston A. Douglas
*Assistant Examiner*—W. J. Shine
*Attorney, Agent, or Firm*—Burgess, Dinklage & Sprung

[57] ABSTRACT

Catalysts for the oxidative purification of exhaust gases such as the exhaust gases from internal combustion engines, are prepared by applying a suspension whose solid content consists essentially of boehmite to a ceramic support body thereby forming an intermediate coating which is adapted to receive one or more metals of the platinum group or alloys thereof in finely divided form. The thus treated support body is thereafter heated. The coating suspension also can contain dissolved aluminum nitrate. The intermediate coating of boehmite on the support body is converted to active aluminum oxide prior to impregnation with one or more metals of the platinum group or alloys thereof in finely divided form or the conversion can take place after such impregnation, for example, by heating upon exposure to the hot exhaust gases of an internal combustion engine.

4 Claims, 4 Drawing Figures

METHOD FOR PREPARING A CATALYST FOR THE OXIDATIVE PURIFICATION OF EXHAUST GASES

RELATED APPLICATIONS

This application is a continuation-in-part of copending application Ser. No. 330,137 filed Feb. 6, 1973 now abandoned.

BACKGROUND

This invention relates to a method for preparing a catalyst for the oxidative purification of exhaust gases, especially the exhaust gases of internal combustion engines, from a ceramic supporting body, an intermediate layer, and a catalytically active surface composed of at least one metal of the platinum group or its alloys in finely divided form.

For the catalytic oxidation of harmful substances in exhaust gases, finely divided metals of the platinum group or alloys thereof, mounted preferably on a support, are used as catalysts. The support consists of refractory material, usually ceramic, and may be in the form of loose granules or in honeycomb-tube form.

To improve the useful life and activity of the catalysts, which are subjected to great stress under the conditions prevailing in the purification of exhaust gases, the supports are provided with an intermediate coating of refractory metal oxide.

U.S. Pat. No. 2,742,437 discloses the creation of this oxide coating through the applicaion of a solution of a compound which can be thermally decomposed to the oxide, or a solution of a compound in which finely divided metal oxide is dispersed, drying, and then heating to form active metal oxide. Aluminum nitrate solution is one of the solutions used for this purpose.

Another possibility of preparing metal oxide coatings containing preferably gamma-alumina or other active aluminum oxides is described in U.S. Pat. No. 3,565,830. A suitable slurry for the preparation of these oxides contains as solids a mixture of 75% gamma-alumina and 25% boehmite; after it is applied it is dried at 110°C and then heated to 500°C.

These metal oxides intermediate coatings improve a number of the properties of the catalysts, but their activity still diminishes with age.

The invention is addressed to the problem of devising a method of preparing a catalyst from a ceramic support body, an intermediate coating, and a surface of one or more metals of the platinum group or alloys thereof in finely divided form, which will have an activity substantially independent of its age.

SUMMARY

This problem is solved by the invention in that, in order to form the intermediate coating, a suspension with a solid content consisting essentially of boehmite is applied to the support body. The coating suspension does not contain aluminum oxides.

The support body is then heated to a temperature between 100° and 300°C so as to achieve drying plus adhesion of the applied boehmite to the support surface to facilitate handling.

Aluminum nitrate may be added to the boehmite suspension. Preferably it then will contain 15 wt-% boehmite and 10 wt-% dissolved aluminium nitrate nonahydrate. After the application of this suspension, the support body is heated to 200° to 300°C, whereupon the thermal decomposition of the aluminum nitrate takes place in addition to the drying and the adhesion of the boehmite.

DESCRIPTION

Figure 1:
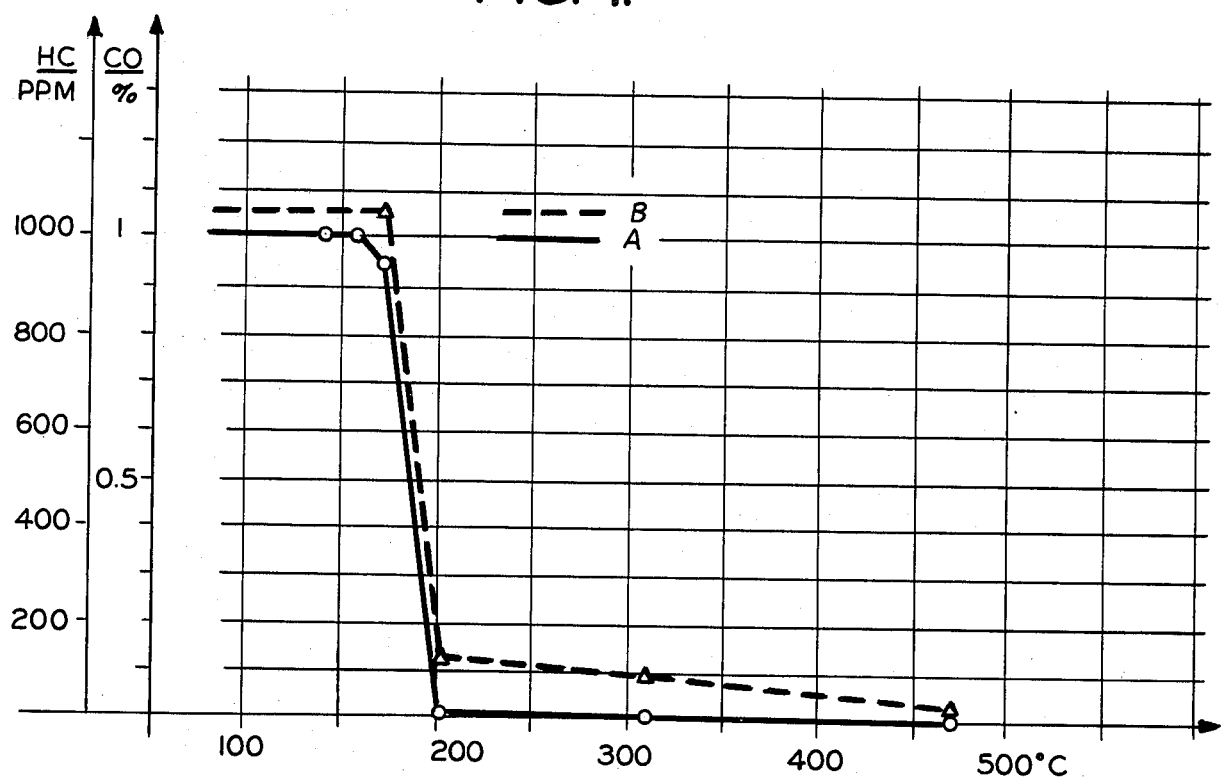
FIGS. 1 and 2 are graphs illustrating the activity of catalysts prepared according to the invention.

Transformation of the boehmite applied to the support body to active aluminum oxide, and of the aluminum oxide formed from the aluminum nitrate, if the latter is added, may be performed before or after application of the finely divided platinum-group metals, which can be done, for example, by impregnation with platinum-group metal salt solutions followed by reduction, for example, by heating the coated support body at 450° to 600°C, preferably at 550°C, for 4 hours.

The support bodies are to have applied to them approximately 5 to 10% of their weight of boehmite. If it should be necessary, the treatment with the boehmite suspension may be repeated. In that case, when the support body treated with the boehmite suspension has been heated at, for example 250°C, boehmite suspension is applied a second time and then the body is heated again.

For the preparation of catalysts in accordance with the method of the invention as described in the examples, a commercial boehmite having the following characteristics was used for the intermediate layer:

| | |
|---|---|
| BET surface area | 250 m²/g |
| Pore volume | 0.65 ml/g |
| Heat treatment loss | approx. 30% |

The grade of boehmite is very easily suspended in water and, at a concentration of about 10% by weight, it produces a suspension of good fluidity and strength of adhesion.

If a boehmite suspension containing aluminum nitrate is used, it has been found advantageous to heat it for about 1 hour at about 95°C before application to the support body, inasmuch as the increase in the viscosity of the suspension which is thereby achieved facilitates uniform coating.

Commercial honeycomb tubes are used as support bodies. These consist of cordierite with contents of mullite and $\alpha$—$Al_2O_3$, and they have the following characteristics:

| | |
|---|---|
| Length: | 6 inches |
| Diameter: | 4 inches |
| Volume: | 1.3 liters |
| Wall thickness: | 0.20 mm |
| Corrugated material with 8 corrugation per inch. | |

The method of the invention is illustrated in the following examples:

EXAMPLE 1

A suspension containing 100 g of boehmite per liter of water is applied at room temperature to a support in the form of a honeycomb tube. After complete impregnation the excess suspension is blown out with compressed air and the support is heated at 250°C. The application of the suspension, blowing out with compressed air, and heating are repeated. Then the coated support is heated for 2 hours at 550°C, whereupon active aluminum oxide is formed. The coating obtained amounts to 6% of the weight of the untreated support. The support body coated with $Al_2O_3$ is then impregnated on its surface with a finely divided platinum-group metal by conventional methods.

EXAMPLE 2

A honeycomb tube is dipped into a suspension containing 10% boehmite by weight. After complete imbibition the excess suspension is blown out with compressed air and the support body is heated at 250°C, cooled, and dipped a second time into the suspension and heated at 250°C. The support body thus coated increases in weight by 6%.

The honeycomb tube is then immersed in a solution containing 9 g/l of platinum as $H_2PtCl_6$. After hot air (250°C) has been blown through the honeycomb tube for 10 minutes, a reduction treatment is performed for one hour with a mixture of hydrogen and nitrogen gas consisting of 5% hydrogen and 95% nitrogen by volume.

EXAMPLE 3

A suspension containing 15 wt-% boehmite and 10 wt-% dissolved aluminum nitrate nonahydrate is heated at 95°C for 1 hour. A honeycomb tube is treated with the suspension after the latter has been cooled at 80°C, and is then blown out with compressed air, heated at 250°C, and then heated for 4 hours 550°C. Impregnation with finely divided platinum is performed, as described in Example 2, by immersing the coated honeycomb tube into a solution containing 9 g/l of platinum as $H_2PtCl_6$, blowing it out with hot air (250°C), and then reducing with a hydrogen-nitrogen gas mixture.

To determine the catalytic activity of a catlyst obtained by the method of the invention and that of one made by using a suspension containing aluminum oxide and boehmite for the production of the intermediate coating, comparative tests were performed which are described in the following example.

EXAMPLE 4

A. Preparation of the prior-art type catalyst

The preparation of the prior-art catalyst was performed by tne method described in Example 2, except that the aqueous suspension used for making the coating was one which contained:

100 g/l $\gamma$—$Al_2O_3$
50 g/l $\alpha$—$Al_2O_3$
50 g/l boehmite
200 g/l aluminum nitrate nonahydrate.

B. Experiments for purposes of comparison

A catalyst prepared by the method of the invention as described in Example 2 and the prior-art type catalyst were installed in the exhaust of an Otto-cycle engine with electronic injection on a stationary engine test stand. In operation, a temperature of about 850°C establishes itself in the catalyst. To enable the cold starting performance of the catalysts to be tested the exhaust gas is cooled. Beginning at an exhaust temperature of about 130°C, the content of carbon monoxide and unburned hydrocarbons (HC) in the exhaust gas was determined. The values obtained are represented as curves in the appended drawings. The values given for the carbon monoxide and unburned hydrocarbon concentration at temperatures below about 130°C were measured in the absence of the catalysts.

Figure 2:
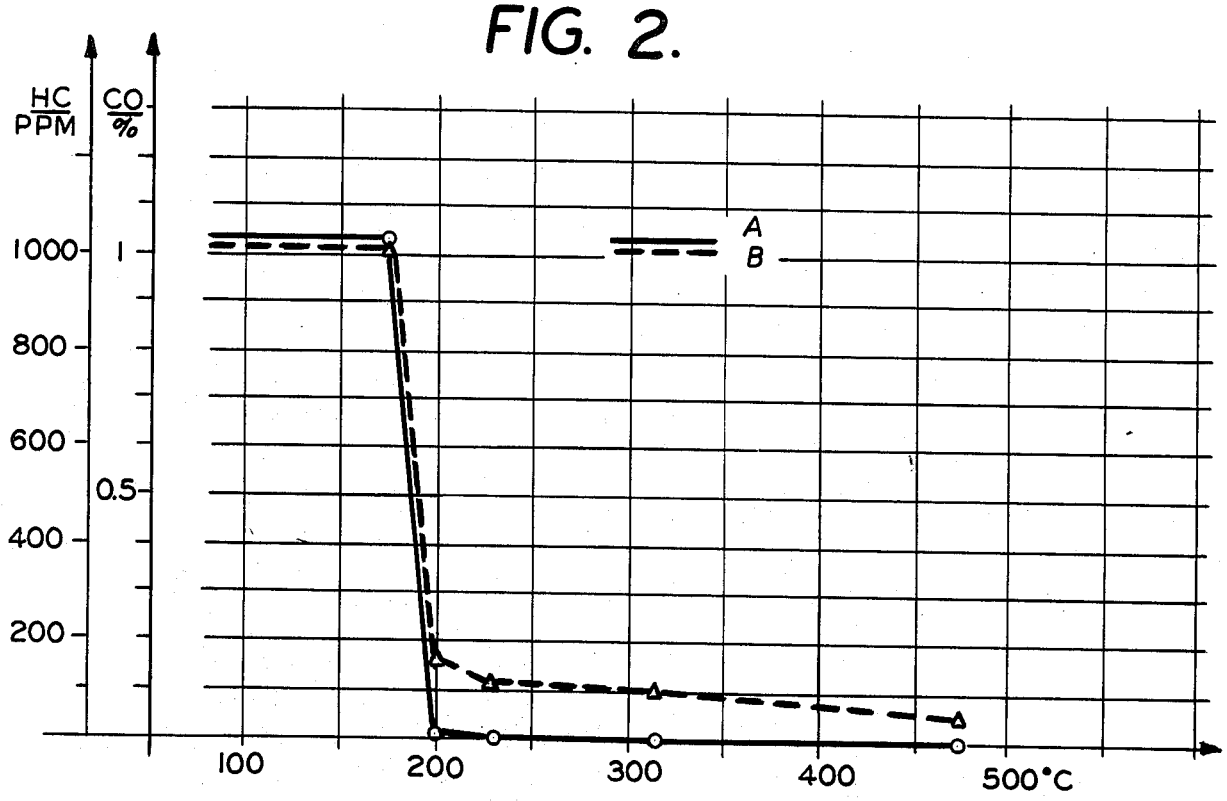

C. Determining the activity of the catalyst prepared by the method of the invention In FIGS. 1 and 2, respectively, are shown the carbon monoxide concentration (Curve A) and the unburned hydrocarbon concentration (Curve B) as measured in the exhaust gas after zero and after 18 hours of operation. The diagrams show that, under the conditions prevailing upon insertion into the exhaust, no diminution of activity occurs and good cold starting characteristics are retained. Both after zero hours and after 18 hours of operation, carbon monoxide is removed completely and the hydrocarbons are removed extensively, beginning at 200°C. After 18 hours of operation, the catalyst has a start-up temperature of about 190°C.

D. Determining the activity of the prior-art type catalyst

Figure 3:
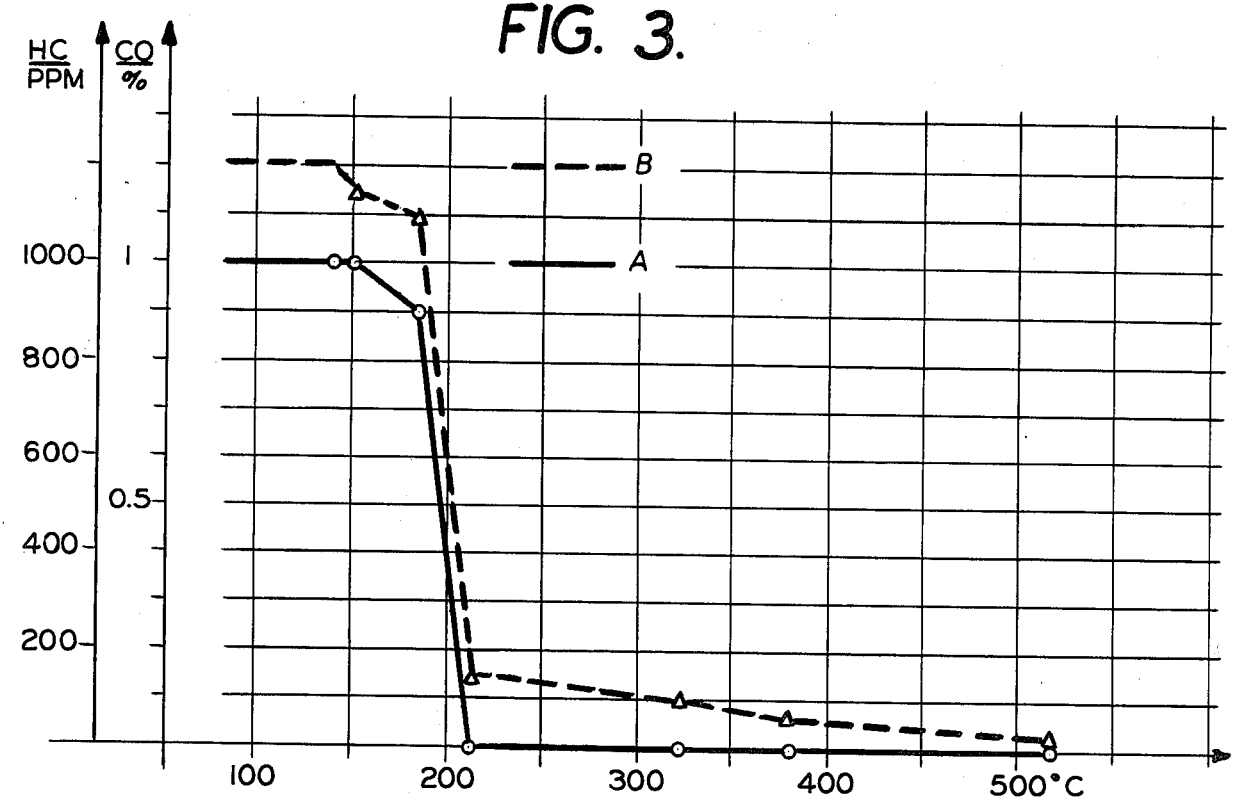
FIGS. 3 and 4 are graphs illustrating the activity of catalysts prepared according to the prior art.
Figure 4:
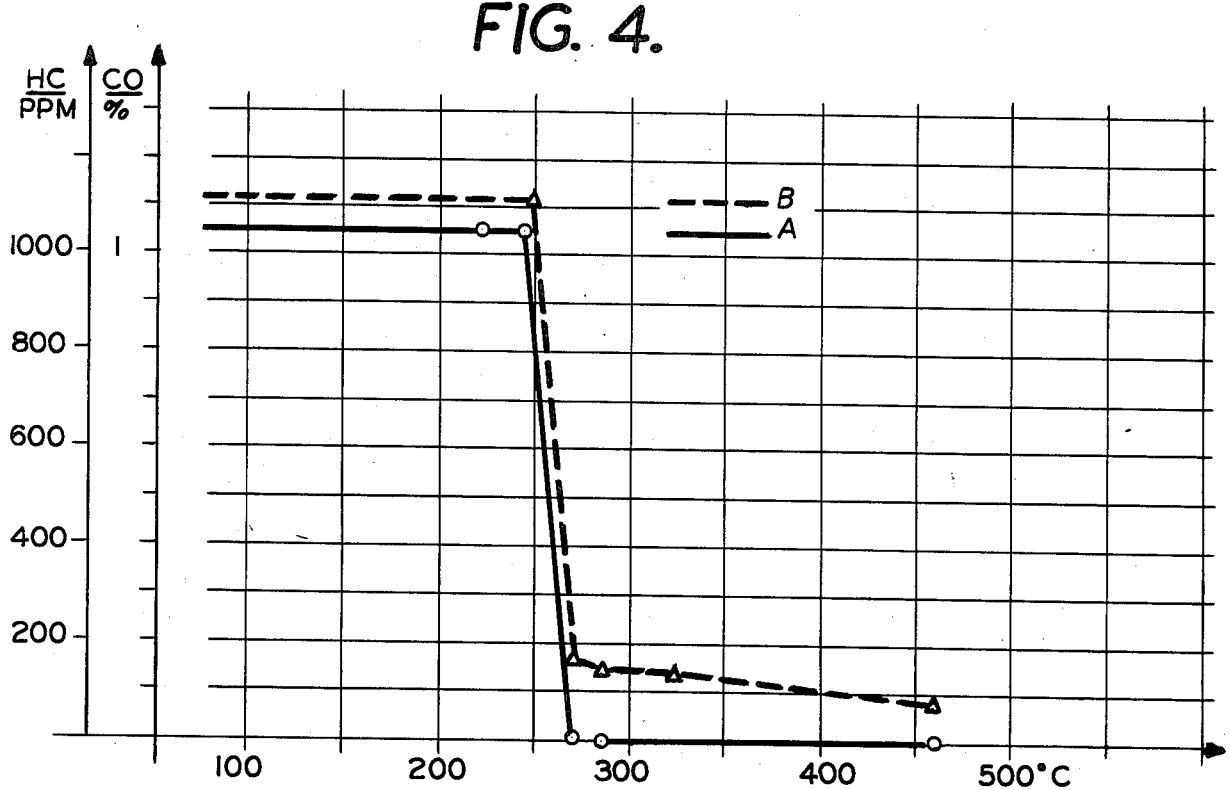

In FIGS. 3 and 4 are shown the carbon monoxide concentration (Curve A) and the unburned hydrocarbon concentration (Curve B) after zero hours and after 18 hours of operation, respectively. The activity of the prior art type catalyst diminishes with the length of time it is in use; after zero hours of operation the carbon monoxide and hydrocarbons are removed beginning at 205°C; after 18 hours of operation they are removed beginning at 270°C. The start-up temperature after 18 hours of operation is around 260°C.

What is claimed is:

1. Method for preparing a catalyst for the oxidative purification of exhausts gases which comprises applying a suspension whose solid content consists essentially of boehmite to a ceramic suport body, followed by a first heat treatment at 100° to 300°C and a second heat treatment at 450° to 600°C, impregnating the so coated support body before or after the second heat treatment with an aqueous solution containing at least one salt of at least one metal of the platinum group and thereafter reducing the metal or metals of the platinum group to the metallic state by reduction with hydrogen.

2. Method of claim 1 wherein a suspension of boehmite containing dissolved aluminum nitrate is applied to the support body and the latter is then heated in said first heat treatment at a temperature between 200° and 200°C.

3. Method of claim 2 wherein the suspension contains 15 wt-% boehmite and 10 wt-% dissolved aluminum nitrate-nonahydrate.

4. Method of claim 2 wherein the suspension is held for about 1 hour at about 95°C prior to its application to the support body.

* * * * *